Nov. 21, 1972  R. W. FISHER  3,703,421

PLASTIC COATED WIRES AND PREPARATION THEREOF

Filed Sept. 29, 1970

INVENTOR
RICHARD W. FISHER
BY Jay Simon
ATTORNEY

United States Patent Office 3,703,421
Patented Nov. 21, 1972

3,703,421
PLASTIC COATED WIRES AND PREPARATION THEREOF
Richard W. Fisher, 6 Fairway Court, Scotch Plains, N.J.
Continuation-in-part of application Ser. No. 724,472, Apr. 26, 1968. This application Sept. 29, 1970, Ser. No. 76,580
Int. Cl. B29f *3/10*
U.S. Cl. 156—244                     5 Claims

ABSTRACT OF THE DISCLOSURE

Plastic coated wires, useful as twist ties for fastening packages and parts and as bag closures are provided in multiple ribbons, each ribbon integral with its adjacent ribbons and detachably attached thereto. The ribbons are prepared by extruding a plurality of thermoplastic ribbons individually, allowing them to expand, join, and seal outside the extrusion die and drawing down the extrudate to the desired cross-sectional configuration.

CROSS REFERENCE

This application is a continuation-in-part of co-pending Ser. No. 724,472 filed Apr. 26, 1968, now abandoned.

FIELD OF INVENTION

This invention relates to flexible plastic coated wires, useful as twist ties, e.g., as bag closures, and their preparation. More particularly, this invention relates to a flexible thermoplastic sheet or film, having embedded therein a plurality of wires, said wires being arranged in a parallel fashion, and the sheet or film being adapted for detaching one or more plastic coated wire ribbons. Still more particularly, this invention relates to a plurality of thermoplastic ribbons, each of which has one or more wires embedded therein, said ribbons being detachably attached to their adjacent ribbons along the entire length of the ribbon.

PRIOR ART

The use of, and preparation of coated wires, particularly where the coating takes on a ribbon-like formation, is rather well known to the fastening art. For example, paper coated wires have long been in use, these being prepared by laminating techniques whereby an endless wire or a series of endless parallel wires are laid upon an endless sheet of paper. A covering sheet of paper is placed upon the wire or wires and the papers are pressed, i.e., laminated, together by well-known techniques. Since coated wires are generally used as individual ribbons, i.e., a ribbon having one wire embedded therein, a product having a plurality of parallel wires must be slit between each wire, the slit being parallel to the wires, in order to allow for detaching the paper ribbons. If the product was not slit, the paper, having a constant cross section, could not be readily torn by the user in the proper place, i.e., so as to make single ribbons, if it could be torn at all since the paper is quite strong (for resisting the conditions of lamination). However, for packaging and counting purposes, the paper is generally never slit completely, i.e., along its entire length (although complete slitting to make individual ribbons is sometimes desirable), and webs are usually intermittently provided to maintain the structural integrity of the product.

Now with the ever increasing use of these coated wire ribbons, applications have been developed where paper is not acceptable as a coating, e.g., for use as plastic bag closures where the bag and its contents will be subjected to boiling water, as in vegetable packaging, and would tend to delaminate or lose its structural integrity, or would not be safe in some food packaging applications. As a result, plastic coated wire ribbons have been developed and have become prominent in applications where paper is unsatisfactory. Generally, the plastic coated wire ribbon is produced by extruding a plastic ribbon over a wire or wires. However, this production has been limited until now to the production of a single ribbon. Standard lamination techniques to prepare a plurality of ribbons with wires embedded in each ribbon have not been successful, perhaps due to the heat and pressure of lamination which forces the plastic to flow away from the wire, i.e., the plastic being forced out from between the wire and the laminating die, thereby creating voids along the length of the wire.

Now since coated wire or wires is normally sold in precut strip lengths (it being much easier for the coated wire manufacturer to precut and package different lengths than for a packager or consumer to do so) some serious problems have arisen in the packaging industry, particularly in the accurate counting of these precut strips. Consider, for example, that plastic bags are sold in rolls of 100 bags. In order to supply twist ties as closures, it is necessary to count out one hundred precut strips, a tedious and time consuming procedure. However by utilizing the invention described herein, it is now possible to prepare a sheet of thermoplastic with a plurality of wires embedded therein, the sheet being adapted for detaching individual ribbons each having at least one wire embedded therein, the sheet thereby containing a multiple of twist ties or ribbons, such as five or ten or twenty which may be easily counted and packaged. Thus, in a precut sheet having twenty detachable ribbons, only five need be counted (instead of one hundred individual pieces) for the roll of one hundred bags. The ease of packaging and counting is now readily appreciated.

SUMMARY OF THE INVENTION

In accordance with this invention, therefore, an article of manufacture is provided which comprises a plurality of flexible thermoplastic ribbons, either of endless length or of any predetermined cut length, the edges of which are arranged in a parallel fashion, preferably in the same plane, each ribbon being detachably attached, by a web along the entire length of the ribbon edge, to its adjacent ribbon or ribbons, and a plurality of wires disposed along the linear axes of said ribbons, at least one wire to a ribbon. Alternatively, the article may be viewed as a flexible extruded thermoplastic sheet, a plurality of wires arranged in a parallel fashion in said sheet and parallel to the direction of extrusion, said sheet having a varying but regularly repeating cross section consisting of a unit having a thickness $t$, followed by a smaller unit having a thickness $<t$, said wires being positioned in the units of thickness $t$, and the sheet being adapted for detaching the $t$ thickness units (ribbons) by tearing along the $<t$ thickness units preferentially. (In the plastics industry, sheet by definition is 0.010 inch thick and greater while film is less than 0.010 inch thick. For the purposes of this invention, however, since the thickness of the article can vary from below 0.010 inch to above 0.010 inch, the term sheet will be used to denote all articles regardless of thickness.)

The article described herein is produced by extrusion. Thus, even if a practical and successful laminating technique for these coated wire ribbons was developed, extruding the multiple ribbons would still be more desirable due to the structural integrity of the extruded sheet (compared to a laminated sheet which could delaminate, have knit lines, voids, and the like, to make the integrity of the laminate more suspect). In a preferred embodiment, moreover, the multiple ribbons are produced by extruding, from single dies, a plurality of thermoplastic ribbons, each containing at least one wire embedded therein, allowing the thermoplastic melt (extrudate) to expand after leaving the die such that adjacent ribbon edges will meet and join and heat seal (the melt still being hot) to form the web of $<t$ thickness along the entire length of adjacent ribbons, and drawing down the integrally attached ribbons as a single sheet, to a desired cross section.

The invention and the process of preparing the wire ribbon will be further illustrated and understood by reference to the attached drawings.

Figure 1:
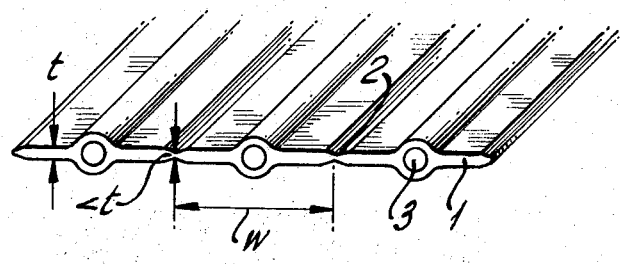
FIG. 1 depicts a perspective view of a typical finished article containing three ribbons.

Turning now to FIG. 1, item 1 shows the cross section of $t$ thickness of the final extruded product, item 2 shows the web joining the ribbons of thickness $<t$, for the entire length of the individual ribbons, and item 3 is a wire that is embedded into each ribbon, the center of the wire corresponding to about $\frac{1}{2}w$. The ribbon thickness $t$, may be any suitable thickness required for a particular application. However, for twist ties the ribbon thickness may generally range from about 0.005 to $\frac{1}{32}$ inch or more and about .100 inch, preferably about 0.010 to about 0.020, e.g., 0.010. The web thickness, however, must be less than $t$ to allow for preferential tearing (detaching) along the web to obtain individual coated wire ribbons. Web thickness will, of course, be somewhat dependent upon ribbon thickness, i.e., the thicker the cross section of the ribbons leaving the die, the greater will be the area that joins on expansion of the melt, assuming constant spacing between adjacent ribbon dies. Also, the spacing of the individual ribbon dies will affect web thicknesses. Generally, however, web thickness should be less than $t$, preferably $0.8t$, more preferably $0.5t$, and one skilled in the art knowing the properties of thermoplastic extrudates will easily determine the proper spacing of the individual ribbon dies to achieve the proper web thickness. The width of the ribbon $w$, is generally about 2 to about 5 and up to about 25 diameters of the wire, e.g., 3 diameters and the wire can be any diameter ranging from 30 gauge to 20 gauge or narrower or larger. It is also possible to use two or more wires in each ribbon, but preferably one wire is used. Of course, when more than one wire is used each wire will be of a smaller diameter than if a single wire is used. (The total area of the wires should generally approximate the area of a single wire.) Total wire diameters are generally greater than $t$ in order to keep the wire from floating in the hot melt, but also may be equal to or smaller than $t$.

It is noted that while the ribbon itself in cross section is shown to have a constant cross section, it is also true that the thickness of the ribbon can taper somewhat from the wire down to the web, i.e., the ribbon thickness at the wire is somewhat greater than at the edge due to drawing. However, $t$ wherever measured will always have the stated relationship to the web which is $<t$.

In a polyethylene ribbon, for example, $t$ may be 0.010 and the web can range from 0.005 to 0.008 thickness, a single 26 gauge wire can be used and $w$ is about $\frac{3}{64}$. The width of the web is not critical and is generally determined by the expansion of the material and the drawing process, e.g., 0.003 to 0.005.

While the drawings show only three ribbons being extruded, a single wire in each, it is understood that, according to this invention, any number of ribbons depending upon size and capacity of the extrusion machine, may be extruded and more than one wire per ribbon may be used. Thus, present extrusion machines can generally handle overall widths of up to about 72 inches.

Figure 2:
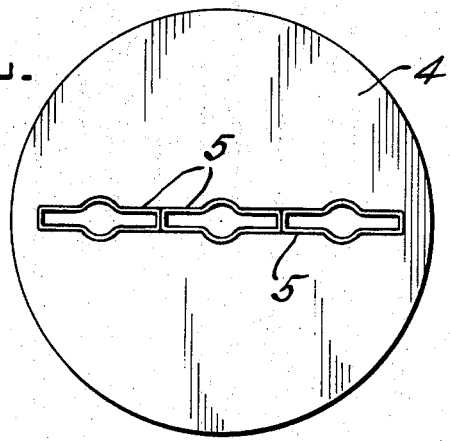
FIG. 2 depicts a simplified die for producing a three ribbon sheet.

FIG. 2 depicts a simplified extrusion die, the die head being item 4, while item 5 shows a plurality of ribbon dies as inserts in the die holder (inserts beng desirable since damage to one ribbon die does not necessitate replacement of all the dies). Now while it is conceivable that the multiwire article could be extruded in a single integral sheet of desired cross section, it is preferred to employ individual ribbons and allow adjacent sides of these ribbons to expand and join together while the extrudate is still hot, since it is believed that better control over the finished article can be maintained in this way. Thus, it is known that drawing tends to create a unified, i.e., constant, cross section and the extrusion of a single sheet of ribbon thickness $t$ and web thickness $<t$ would have to be controlled rather carefully in order to preserve the thickness differential. Further, the hot melt leaving the die, would tend to expand and flow towards the thinner sections, thus further destroying the thickness differential between ribbon and web. However, because the material expands when it leaves the die, advantage of this factor may be taken by extruding individual ribbons and allowing expansion freely, rather than attempting to channel or restrict it, and permitting adjacent sides to join and seal integrally in the desired web thickness so that an end user can readily detach individual ribbons as needed.

Figure 3:
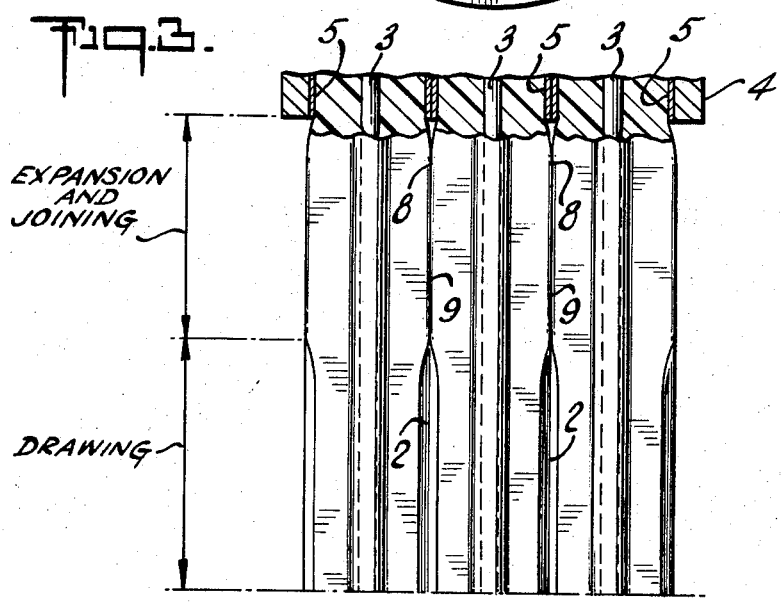
FIG. 3 depicts the expansion and joining of the ribbons as they leave the die and the necking down to form the desired cross section in the finished article.

FIG. 3 depicts a plan view of the melt leaving the extrusion die wherein the wires 3 are fed through the individual ribbon insert dies 5, leave the die surface as single ribbons, and join at 8 to form knit line 9, and are drawn down to form the web 2.

As mentioned, the multiwire sheet is prepared by extruding individual ribbons, each ribbon having at least one wire embedded therein, said wires being embedded lengthwise in the ribbons, i.e., parallel to the direction of extrusion (or the longitudinal axis of the ribbon). Now extrusion is a generally well-known process which basically involves forcing a hot plastic melt through a die or dies having openings shaped to produce a desired cross section. However, the opening in the die does not always correspond to the finished cross section and this feature is taken advantage of herein. Thus, a straight side in a die will normally produce a convex shape in the extrudate. When two straight sides are adjacent to each other, as adjacent sides of two individual ribbon dies, convex surfaces are produced in each ribbon extrudate that will touch while still hot and seal. As the extrudate leaves the die, and while still hot, i.e., in a molten state, adjacent sides expand in a convex fashion, join, and heat seal and the nonintegral sheet of repeating alternating cross-sectional units of $t$ and $<t$ is drawn down by pulling the extrudate away from the die, e.g., by wrapping around a motorized reel or capstan, at a higher linear speed than that at which the extrudate leaves the die. This results in the width and thickness of the extrudate necking down to a smaller width and thickness in proportion to the differential in take-up and extrusion velocities, i.e., increasing differential in favor of take-up velocity increases the amount of necking down. The drawing step is continued for as long as necessary to achieve the desired cross section, i.e., for any length of time before the web and ribbon become of equal thickness, but generally until such time that as the $t$'s and $<t$'s are of uniform respective thicknesses, i.e., to line out the convex shapes. Now since the drawing operation tends to equalize web and ribbon thickness, i.e., tends toward a uniform cross section (see Modern Plastics Encyclopedia, 1968, page 756, published by McGraw-Hill), the basic differential between web and ribbon thickness must be set at the die head. Thus, depending upon the choice of material, its properties and conditions of extrusion, the spacing between the individual ribbon dies can be set by one skilled in the art and the proper web thickness easily controlled.

It is noted here that the thermoplastic sheet produced herein by joining the plurality of ribbons has alternating cross section thicknesses of $t$ and $<t$ for permitting detaching at $<t$ sections. Paper or plastic ribbons made by lamination, however, have relatively constant cross sections and cannot be preferentially detached at any given position (unless slitting is employed).

After the melt leaves the die, expands, joins, seals, and is drawn down it may be cooled and set by casting on chilled rolls, blowing chilled air over the melt, passing the melt through a controlled temperature water bath, or any combination of the foregoing. After cooling the multi-wire ribbon is taken up on reels or like storage devices or the ribbon can be cut. The ribbon can be cut at any time to predetermined lengths, e.g., 4", 5", 6", 10", 25", and the like.

A wide variety of materials may be employed to produce the ribbon. Basically, the only requirements are that the material be capable of extrusion and that the product be flexible enough for twisting. In this regard, such thermoplastic materials as polyethylene, polystyrene, vinyl chloride homopolymers or copolymers of vinyl chloride with ethylenically unsaturated monomers, e.g., acrylates, vinyl acetate, vinyl propionate, etc., vinylidene chloride, polytetrafluoroethylene, polychlorotrifluoroethylene, polyamides, acrylates, polyurethane, polycarbonates, polymers of ethyl vinyl acetate and ethyl vinyl propionate, etc. may be used. Extrusion grades of these materials are readily available. Of the foregoing, low density polyethylene, and vinyl chloride polymers are preferred, particularly the low density polyethylene. Extrusion conditions will, of course, vary with the material chosen. The melt index of the plastic, however, is an important variable and for polyethylene the melt index may range from about 0.920 to 0.950, preferably 0.920 to 0.930, e.g., 0.920. (At constant extrusion temperatures, a higher melt index corresponds to a melt of lower viscosity.) Again using polyethylene as an example, extrusion temperatures may range from about 300° to 600° F., preferably 380° to 420° F., e.g., 400° F., and extrusion speeds are usually under about 1000 ft./min., preferably at about 7000 ft./hr. Under the preferred conditions shown here for polyethylene the adjacent sides of individual ribbon dies may be less than about 0.025 inch apart, preferably less than about 0.020 inch apart. It should be noted that the spacing between adjacent dies is somewhat critical in that if the spacing is too wide the materials cannot expand enough and will not meet and join to form the web. While it is difficult to state with great accuracy what the spacings should be (because of dependence upon choice of material) die swell factors for various materials and die configurations can usually be obtained from material suppliers and will be known to those skilled in the art. However, routine experimentation will also allow for the ready determination of these conditions.

The wires which may be embedded in the plastic are generally metallic such as steel, aluminum, copper, etc., and of any desired diameter, e.g., 26 gauge or 0.018 or two wires of say 30 gauge or three of about 43 gauge. Extruding the wire or wires through the die so as to have it embedded in the plastic ribbon is also a well-known practice and requires only a take-up drive and feed reel, for example, the wire or wires being drawn through the die at the same rate as the mtaerial is forced through the die.

To further illustrate the claimed method of preparing the plastic coated wires dscribed herein, one can consider an extrusion die having a parting line parallel to the axis of extrusion and along a horizontal plane through the extrusion die. The two halves of the die can be press fitted or shrunk fit into a retaining ring and positioned adjacent to the nozzle of the extrusion machine. The face of each half is machined with several, e.g., five, semi-circular or strip-like grooves which when the faces are aligned form five holes running through the extrusion die and parallel to the axis of extrusion. Each hole is separated by a sort of web. Now, with a hole of about $9/64$ inch width, each web is about $1/32$ inch wide. As the extrudate leaves the die five separate ribbons are formed. As mentioned, the extrudate will swell and each ribbon of extrudate will touch and join the adjacent ribbon. The wires move with the plastic material through the grooves and become embedded in the plastic.

What is claimed is:

1. A process for preparing a thermoplastic sheet having a plurality of wires arranged therein in parallel fashion which comprises extruding, from extrusion dies having a spaced relationship, a plurality of individual thermoplastic ribbons, each of said ribbons having at least one wire disposed therein parallel to the direction of extrusion, permitting the free expansion of each of said ribbons as they leave the extrusion dies, joining adjacent ribbons along their lengthwise edges after leaving the extrusion die and while the thermoplastic is in the molten state thereby forming a web between adjacent ribbons having a thickness less than that of said ribbons, the joining of adjacent ribbons being solely accomplished by contacting of the adjacent ribbons due to the free expansion of each of said ribbons, said joined ribbons making up an integral thermoplastic sheet, drawing said thermoplastic sheet such that said webs and said ribbons are of relatively uniform respective thickness.

2. The process of claim 1 wherein said thermoplastic is polyethylene.

3. The process of claim 1 wherein each ribbon has one wire disposed therein.

4. The process of claim 1 wherein the thickness of said ribbons ranges from about 0.010 to about $1/32$ inch and the thickness of said web is no more than about 0.8 times the thickness of said robbons.

5. The process of claim 1, wherein cooling of the thermoplastic is effected subsequent to the joining of adjacent molten thermoplastic ribbons.

References Cited
UNITED STATES PATENTS

| 2,204,782 | 6/1940 | Wermine | 264—174 X |
| 3,527,859 | 9/1970 | Fairbanks | 264—210 X |
| 2,669,754 | 2/1954 | Chadbourne | 264—174 X |
| 2,979,431 | 4/1961 | Perrault | 264—174 X |

RALPH S. KENDALL, Primary Examiner

U.S. Cl. X.R.

156—296, 306; 264—172, 174, 210; 161—143